United States Patent Office 3,775,483
Patented Nov. 27, 1973

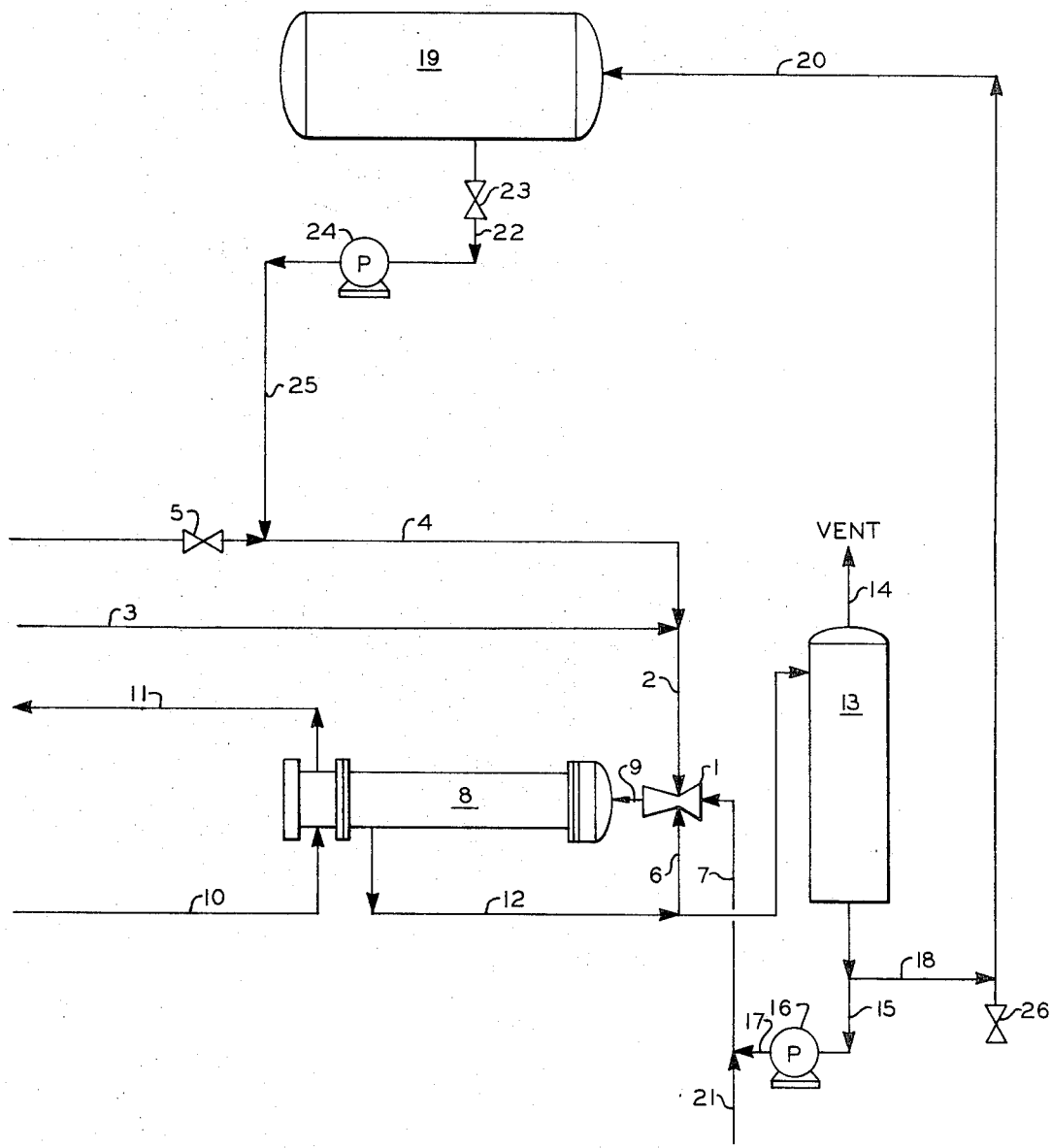

3,775,483
PROCESS FOR PRODUCING A MONO-CONDENSATION PRODUCT OF AN ALKYLENE OXIDE AND A MERCAPTAN
Stanley W. Frederickson and Ralph E. Watson, Borger, Tex., assignors to Phillips Petroleum Company
Filed Nov. 9, 1970, Ser. No. 87,867
Int. Cl. C07c 149/18
U.S. Cl. 260—609 R            6 Claims

ABSTRACT OF THE DISCLOSURE

A two-stage reaction of alkylene oxide and a mercaptan to form mono-condensates of the formula

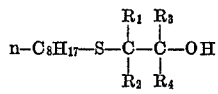

where $R_1$, $R_2$, $R_3$ and $R_4$ are selected from the group consisting of hydrogen, methyl, ethyl, propyl, isopropyl, n-butyl, isobutyl, and tert-butyl radicals and the total number of carbon atoms in $R_1$, $R_2$, $R_3$ and $R_4$ does not exceed 4, is carried out wherein said alkylene oxide is contacted with a stoichiometric excess of said mercaptan in a first reaction step to produce a reaction mixture comprised of said condensate and residual mercaptan. The reaction mixture is contacted with additional alkylene oxide in a second reaction step to react with the residual mercaptan and produce additional condensate product.

---

This invention relates to a process for the production of a mono-condensation product of an alkylene oxide and a mercaptan.

It is known from theoretical consideration that the reaction between an alkylene oxide and a mercaptan proceeds on an equimolar basis, i.e., 1 mole of alkylene oxide theoretically reacts with 1 mole of mercaptan to produce 1 mole of mono-condensation product. Thus, in the prior art, the process of preparing the product has been based upon combining the reactants in substantially equimolar concentrations or with a slight stoichiometric excess of alkylene oxide. In utilizing the process of the prior art undesirable side reactions occur which reduce the conversion of the reactants to the desired product. Furthermore, the process of the prior art requires post reaction processing such as fractionation to separate the desired mono-condensation product from the undesirable byproducts produced by the above mentioned side reactions.

It is thus an object of this invention to provide an improved process for the production of a mono-condensation product of an alkylene oxide and a mercaptan.

It is another object of this invention to provide a process for the production of 2-hydroxyethyl-n-octyl sulfide.

Other objects, aspects, and the several advantages of this invention will be apparent to one skilled in the art from a study of the following specification, figure and appended claims.

We have now discovered an improved process for the production of a mono-condensation product of an alkylene oxide and a mercaptan which comprises two reaction steps. In the first reaction step an alkylene oxide is contacted with a stoichiometric excess of a mercaptan under reacting conditions. This first step produces a reaction mixture comprised of the desired mono-condensation product and a residual amount of the mercaptan which, owing to the fact that it was introduced in stoichiometric excess, is unreacted. In the second reaction step the above-referred-to reaction mixture is contacted with an additional amount of the alkylene oxide under reacting conditions. In this second step the added alkylene oxide reacts with the unreacted residual mercaptan to produce an additional quantity of the desired mono-condensation product. The quantity of alkylene oxide added to the reaction mixture in the second reaction step is sufficient to substantially, if not completely, convert all of the residual mercaptan to the desired mono-condensation product; however, the amount of alkylene oxide added is not in stoichiometric excess of the residual mercaptan.

The additional alkylene oxide can be introduced in a single step, or it can be introduced in a plurality of steps. Contacting the reaction mixture with the additional alkylene oxide in a single step can be accomplished in a second reaction step immediately after the first reaction step. This mode of operation requires precise knowledge of the residual mercaptan content of the reaction mixture such that the precise quantity of alkylene oxide can be added. The preferred mode of operation, which is further described in connection with the figure, below, involves contacting the reaction mixture with alkylene oxide in a plurality of steps. In this mode the alkylene oxide is added in diminishing increments in response to the diminishing concentration of mercaptan in the reaction mixture.

By contacting the alkylene oxide and mercaptan reactants according to the process of this invention, the conversion to the desired product is substantially increased with respect to the conversion of the prior art. Furthermore, by operating according to the process of this invention the product is in sufficient purity to preclude the need for post reaction separation.

It is known that certain mono-condensation products of alkylene oxides with mercaptans which can be produced by the process of our invention are useful as stable fly repellents. Of these mono-condensation products those considered most useful as stable fly repellents are represented by the general formula

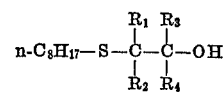

In the above formula, $R_1$, $R_2$, $R_3$, and $R_4$ can be hydrogen, a methyl radical, an ethyl radical, a propyl or isopropyl radical, or a normal, iso- or tert-butyl radical in any combination such that the total number of carbon atoms in $R_1$, $R_2$, $R_3$, and $R_4$ does not exceed four.

Examples of compounds characterized by the above structural formula which are applicable as stable fly repellents are:

2-hydroxyethyl n-octyl sulfide,
2-methyl-2-hydroxypropyl n-octyl sulfide,
2(3-hydroxybutyl) n-octyl sulfide,
3(4-hydroxyhexyl) n-octyl sulfide,
2(3-hyroxy-4-methylpentyl) n-octyl sulfide,
2(1-hydroxyhexyl) n-octyl sulfide,
2-hydroxy-3,3-dimethylbutyl n-octyl sulfide,
2-hydroxybutyl n-octyl sulfide,
2-hydroxy-3-methylbutyl n-octyl sulfide, and
2-hydroxypropyl n-octyl sulfide.

It can be seen that the preferred mercaptan is n-octyl mercaptan.

Alkylene oxides which can be reacted with mercaptans to form the mono-condensation product repellent material include ethylene oxide, propylene oxide, 2-methyl-1,2-epoxypropane, 2,3 - epoxybutane, 3-methyl-1,2-epoxybutane, 2 - methyl-2,3-epoxybutane, 2,3-epoxyhexane, and 3,3-methyl-1,2-epoxybutane.

Examples of mercaptans which can be reacted with the alkylene oxides include n-octyl mercaptan, tert-octyl mercaptan, tert-nonyl mercaptan, n-decyl mercanpta, tertdodecyl mercaptan, n-dodecyl mercaptan, tert-tetradecyl mercaptan, and phenyl ethyl mercaptan.

Referring now to figure, which is a flow process depicting the preferred mode of operation, the production of 2-hydroxyethyl-n-octyl sulfide by the reaction of ethylene oxide and n-octyl mercaptan is shown, and described.

A feed stream consisting of ethylene oxide and normal octyl mercaptan in the molar ratio of ethylene oxide to mercaptan in the range of 0.75 to 1 to 0.99 to 1, preferably 0.95 to 1, is introduced into mixing zone 1 via line 2. The ethylene oxide is introduced into line 2 via line 3 and the normal octyl mercaptan is introduced into line 2 via line 4 and valve 5. The rate of addition of ethylene oxide and n-octyl mercaptan are adjusted by suitable means so as to provide the above-mentioned molar ratio. The feed stream, in combination with the hereinafter described recycle stream introduced into mixing zone 1 via line 6 and the hereinafter described combination catalyst stream and aspirator stream introduced into mixing zone 1 via line 7, is introduced into reaction heat exchange zone 8 via line 9. The ethylene oxide and normal octyl mercaptan react in reaction zone 8 in the presence of a catalyst, which is a 25 weight percent solution of sodium hydroxide in methanol, at a temperature in the range of 130° to 140° F. The reaction between ethylene oxide and normal octyl mercaptan in the reaction zone produces a reaction mixture comprised of the desired 2-hydroxy ethyl n-octyl sulfide and a minor quantity of unreacted normal octyl mercaptan. The unreacted normal octyl mercaptan is present in the reaction mixture on account of the feed stream concentration which contained a stoichiometric excess of normal octyl mercaptan.

The reaction in reaction zone 8 is exothermic, therefore the heat of reaction is removed by introducing coolant into reaction zone 8 to provide indirect heat exchange with the reaction mixture. The coolant, such as water, is introduced via line 10 and withdrawn via line 11.

The reaction mixture leaves reaction zone 8 via line 12. A major proportion of the reaction mixture, approximately 55 to 80 percent, is removed from line 12 via line 6 and recycled to reaction zone 8 via mixing zone 1 and line 9. The remainder of the reaction mixture, approximately 20 to 45 percent, is introduced into surge zone 13 via line 12. Surge zone 13 is maintained at a pressure in excess of atmospheric, preferably 40 pounds per square inch gauge. Excessive pressures in surge zone 13 are released by appropriate valving through vent 14.

The reaction mixture leaves surge zone 13 via line 15, the major proportion of which is returned to mixing zone 1 via pump 16, line 17 and line 7. Introduction of stream 7 at high velocity into mixing zone 1 serves to aspirate streams 2 and 6 into said zone wherein said streams 2, 6, and 7 are rapidly and efficiently mixed. A minor proportion of the reaction mixture is withdrawn from line 15 via line 18 and introduced into storage zone 19 via line 20.

The reaction mixture flows to storage zone 19 and is maintained therein until such time as a desired quantity of reaction mixture is contained therein, at which time the flow of normal octyl mercaptan in line 4 is terminated by the closing of valve 5 and the flow of ethylene oxide in line 3 is terminated by appropriate means.

From time to time during the reaction, catalyst is introduced into the reaction zone 8 by means of line 21, line 7, mixing zone 1 and line 9. A catalyst which, as previously mentioned, is a 25 weight percent solution of sodium hydroxide in methanol is mixed with the feed stream and recycle streams in mixing zone 1. The recycle stream from surge zone 13 which is introduced into mixing zone 1 via line 17 and line 7 serves to flush the catalyst through line 7 and to draw the reaction mixture from line 12 via line 6.

This first reaction step produces a reaction mixture having a residual mercaptan content in the range of 5 to 25 percent by weight of the reaction mixture.

When a desirable quantity of reaction mixture has been produced into storage zone 19 and the flow of normal octyl mercaptan and ethylene oxide has been terminated in lines 4 and 3 respectively, the second reaction step can then proceed. In the second reaction step, reaction mixture is withdrawn from storage zone 19 via line 22, valve 23, and pump 24 and introduced into line 4 via line 25 in order to establish circulation from storage zone 19, through reaction zone 8 and surge zone 13, and back to storage zone 19. The reaction mixture in line 4 is then combined with ethylene oxide in line 2 which is introduced therein via line 3. The quantity of ethylene oxide introduced via line 3 is dependent upon the concentration of normal octyl mercaptan contained in storage zone 19; however, it is not in stoichiometric excess of the concentration of normal octyl mercaptan in the reaction mixture and it is preferably less than the stoichiometric quantity required to completely react with the mercaptan sulfur. The second reaction step is then conducted as above described with respect to the first reaction step and the reaction mixture from storage zone 19 is circulated until analysis shows the mercaptan content of the reaction mixture to be substantially zero. Periodic samples for analysis can be removed via valve 26 and the quantity of ethylene oxide introduced via line 3 is reduced corresponding with the reduced concentration of mercaptan determined by the analysis of the mixture removed through valve 26.

EXAMPLE

A batch of 2-hydroxyethyl-n-octyl sulfide was produced according to the process of this invention as described with reference to the figure wherein ethylene oxide, at 209 lb./hr. (4.75 moles/hour), and n-octyl mercaptan at 732 lb./hr. (5 moles/hour) were reacted in reaction zone 8. The molar ratio of ethylene oxide to n-octyl mercaptan in line 2 was thus maintained at approximately 0.95 to 1. The reaction was conducted in the presence of sodium hydroxide catalyst which was periodically introduced into reaction zone 8 as a 25 weight percent solution of sodium hydroxide in methanol. The catalyst solution was introduced in 1 gallon increments approximately 2 gallons per day. The reaction mixture in reaction zone 8 was maintained at approximately 130° F. by circulating water in indirect heat exchange with the reaction mixture in reaction zone 8.

The reaction mixture was removed from reaction zone 8 via line 12 at rates of 600 to 800 gallons per minute and recycled to reaction zone 8 via line 6 at rates of 400 to 600 gallons per minute. The reaction mixture was also introduced into surge zone 13 at the rate of approximately 202 gallons per minute and recycled to reaction zone 8 via pump 16 at the rate of approximately 200 gallons per minute. Reaction mixture was introduced into storage zone 19 via line 20 at 941 lb./hr. (approximately 2 gallons per minute).

The reaction was continued as above described until approximately 5000 gallons of reaction mixture had been produced to storage zone 19, which required approximately 42 hours, at which time the flows of ethylene oxide and n-octyl mercaptan were terminated.

The reaction mixture in storage zone 19, which contained approximately 5 weight percent unreacted n-octyl mercaptan, was then circulated from storage zone 19 via pump 24, line 25 and line 4 to reaction zone 8 at a rate of approximately 100 gallons per minute. The reaction mixture was circulated from reaction zone 8 through lines 12 and 6 and mixing zone 1 at rates of 400 to 600 gallons per minute, and the reaction mixture was introduced into surge zone 13 at a rate of approximately 300 gallons per minute. Reaction mixture was then recycled to reaction zone 8 via lines 17 and 7 at 200 gallons per minute, and returned to storage zone 19 via line 20 at a rate of 100 gallons per minute.

During the circulation of reaction mixture as above described samples were periodically taken for analysis via valve 26. Incremental addition of ethylene oxide to react with the residual n-octyl mercaptan in the circulating reaction mixture was made in response to the analysis of the sample. When circulation began, ethylene oxide was introduced via line 3 at approximately 60 lb./hr. As the circulation continued, the ethylene oxide addition rate was diminished in response to the diminishing amount of n-octyl mercaptan. When the sample analysis indicated substantially 0 weight percent n-octyl mercaptan, the ethylene oxide addition rate was also zero.

Analysis of the reaction mixture in storage zone 19 by gas liquid chromatography at the end of the run gave the results tabulated in Table I.

Owing to the high percentage of 2-hydroxyethyl-n-octyl sulfide the mixture was then available for use as fly repellent without further processing.

In contrast, a batch of 2-hydroxyethyl-n-octyl sulfide was prepared according to the process of prior art. That is, the molar ratio of ethylene oxide to n-octyl mercaptan was maintained at approximately 1 to 1, the theoretical stoichiometric combining ratio, and the reaction mixture was not recycled from storage zone 19 through reaction zone 8. However, the reaction was otherwise conducted as previously described with respect to the initial reaction between ethylene oxide introduced via line 3, and n-octyl mercaptan introduced via line 4.

The analysis of the reaction mixture in storage zone 19 at the end of this run by gas liquid chromatography gave the results tabulated in the table. Owing to the lower percentage of 2-hydroxyethyl-n-octyl sulfide and higher percentage of unknown material, the reaction mixture required further processing to separate the desired product.

TABLE.—ANALYSES OF PRODUCTS BY GAS-LIQUID CHROMATOGRAPHY

| Component, wt. percent | By our invention | Prior practice |
|---|---|---|
| Ethylene oxide | Trace | Trace |
| Unknown "peak" | 0.2 | 0.1 |
| n-Octyl mercaptan | Trace | 0.1 |
| Unknown "peak" | 2.8 | 2.8 |
| 2-hydroxyethyl-n-octyl sulfide | 94.3 | 87.0 |
| Unknown "peak" | 2.7 | 10.0 |
| Concentration by freezing point, mol percent | 90.0 | <80 |
| Distillation at 5 mm. Hg press., ° F.; | | |
| IBP | 269 | 266 |
| 5% over | 273 | 268 |
| 10% over | 270 | 270 |
| 50% over | 276 | 273 |
| 80% over | 278 | 276 |
| 90% over | 279 | 294 |
| 95% over | 284 | 452 |

The unknown "peaks" in the table refer to concentrations of components which could not be identified but which were impurities as their peaks were easily distinguishable from that of the desired product. The improved purity of the product according to our invention is evident.

Reasonable variations and modifications of this invention can be made, or followed, in view of the foregoing disclosure, without departing from the spirit or scope thereof.

What is claimed is:

1. A process for the production of a mono-condensation product of the general formula

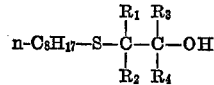

wherein $R_1$, $R_2$, $R_3$ and $R_4$ are selected from the group consisting of hydrogen, methyl, ethyl, propyl, isopropyl, n-butyl, isobutyl and tert-butyl radicals and the total number of carbons in $R_1$, $R_2$, $R_3$ and $R_4$ does not exceed four, which comprises:

(a) introducing into a reaction zone a mercaptan of the formula

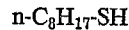

and an alkylene oxide of the formula

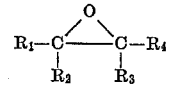

wherein each of said $R_1$, $R_2$, $R_3$ and $R_4$ is as above defined and wherein the molar ratio of said alkylene oxide to said mercaptan is in the range of 0.75:1 to 0.99:1;

(b) reacting said alkylene oxide with said mercaptan in said reaction zone whereby there is produced a reaction mixture comprised of said mono-condensation product and a residual amount of unreacted mercaptan; thereafter (c) contacting said reaction mixture under reaction conditions in a reaction zone with an additional amount of said alkylene oxide in an amount sufficient thereby to convert substantially all of said residual mercaptan to said mono-condensation product and wherein the reaction mixture from step (b) is introduced into a storage zone wherein said reaction mixture is held pending completion of initial step (a) reaction of said alkylene oxide and said mercaptan and wherein said reaction mixture is thereafter contacted with additional alkylene oxide in step (c).

2. The process of claim 1 wherein said mono-condensation product is 2-hydroxyethyl-n-octyl sulfide, said alkylene oxide is ethylene oxide and said mercaptan is n-octyl mercaptan.

3. The process according to claim 1 wherein said reaction is carried out at a temperature in the range of 130° to 140° F.

4. The process of claim 3 wherein said process is carried out in the presence of a catalyst consisting essentially of a 25 weight percent solution of sodium hydroxide in methanol.

5. The process of claim 1 wherein said step (c) is repeated until the quantity of said unreacted mercaptan is reduced substantially to a value of zero.

6. The process of claim 1 wherein said molar ratio is 0.95:1.

References Cited

UNITED STATES PATENTS 2,776,997  1/1957  Douman ........ 260—609 R
2,863,799  12/1958 Goodhue et al. ...... 260—608
3,487,113  12/1969 Anderson ........ 260—609 R

OTHER REFERENCES

Zilberman et al., "J. Org. Chem., U.S.S.R.," vol. 2 (1966).

LEWIS GOTTS, Primary Examiner

D. R. PHILLIPS, Assistant Examiner

U.S. Cl. X.R.

424—337, Digest 10